(12) United States Patent
Yagil et al.

(10) Patent No.: US 10,505,571 B1
(45) Date of Patent: Dec. 10, 2019

(54) ESTIMATION OF INTERFERENCE SUPPRESSION FILTERS USING SELECTIVE SIGNAL SWITCHING

(71) Applicant: Capacicom Ltd., Kfar Netter (IL)

(72) Inventors: Ariel Yagil, Ein Sarid (IL); Ronen Mayrench, Raanana (IL)

(73) Assignee: Capacicom Ltd., Kfar Netter (IL)

( * ) Notice: Subject to any disclaimer, the term of this patent is extended or adjusted under 35 U.S.C. 154(b) by 0 days.

(21) Appl. No.: 16/446,643

(22) Filed: Jun. 20, 2019

Related U.S. Application Data (60) Provisional application No. 62/690,357, filed on Jun. 27, 2018.

(51) Int. Cl.
*H04B 1/10* (2006.01)
*H04B 1/62* (2006.01)
*H04B 1/04* (2006.01)

(52) U.S. Cl.
CPC ............ *H04B 1/0475* (2013.01); *H04B 1/10* (2013.01)

(58) Field of Classification Search
None
See application file for complete search history.

(56) References Cited

U.S. PATENT DOCUMENTS

| | | | |
|---|---|---|---|
| 6,704,349 B1 * | 3/2004 | Masenten | H04B 1/123 375/219 |
| 7,142,094 B1 | 11/2006 | Davidow et al. | |
| 8,175,535 B2 | 5/2012 | Mu | |
| 8,249,536 B2 * | 8/2012 | Jung | H04B 1/525 455/222 |

(Continued)

FOREIGN PATENT DOCUMENTS

WO 2004114578 A1 12/2004

OTHER PUBLICATIONS

Cable Television Laboratories, "Data-Over-Cable Service Interface Specifications: Physical Layer Specification, DOCSIS® 3.1", CM-SP-PHYv3.1-I13-171220, Annex F,pp. 1-295, Dec. 20, 2017.

(Continued)

*Primary Examiner* — Tuan A Tran
(74) *Attorney, Agent, or Firm* — Kligler & Associates (57) ABSTRACT

A transceiver includes a transmission chain, a reception chain, an interference suppression module and a processor. The transmission chain transmits a downstream signal to a communication network. The reception chain receives an upstream signal including (i) upstream transmissions originating by client devices, and (ii) an interference signal created by leakage and reflections of the downstream signal. The reception chain includes a configurable switch for connecting or disconnecting the upstream signal. The interference suppression module applies to the downstream signal a filter response function for generating an interference suppression signal to be subtracted from the upstream signal at a selected suppression point. The processor estimates the filter response function by monitoring the upstream signal while toggling the switch to connect and disconnect the upstream signal, and, sets the switch to connect the upstream signal and configures the interference suppression module to apply the filter response function to the downstream signal.

20 Claims, 3 Drawing Sheets

(56) References Cited

U.S. PATENT DOCUMENTS

| | | | | |
|---|---|---|---|---|
| 8,400,234 B2* | 3/2013 | Yang | ................... | H04B 1/525 |
| | | | | 333/109 |
| 8,462,836 B2* | 6/2013 | Choi | ................... | H04B 1/525 |
| | | | | 375/224 |
| 8,463,201 B2* | 6/2013 | Jung | ................... | H04B 1/525 |
| | | | | 455/114.2 |
| 8,743,745 B2* | 6/2014 | Sarca | ................... | H04B 1/40 |
| | | | | 370/277 |
| 9,966,993 B2 | 5/2018 | Jin et al. | | |
| 10,063,363 B2* | 8/2018 | Negus | ................... | H04B 1/525 |
| 2010/0048146 A1* | 2/2010 | McCallister | ........... | H04B 1/525 |
| | | | | 455/78 |
| 2012/0195351 A1 | 8/2012 | Banwell et al. | | |
| 2014/0269864 A1* | 9/2014 | Aparin | ................... | H04B 1/40 |
| | | | | 375/221 |
| 2016/0036490 A1 | 2/2016 | Wu et al. | | |
| 2016/0156381 A1 | 6/2016 | Rydstrom et al. | | |
| 2016/0308562 A1* | 10/2016 | Wyville | ................ | H04B 1/525 |
| 2016/0308661 A1 | 10/2016 | Liebl | | |
| 2017/0237491 A1 | 8/2017 | Mutalik et al. | | |
| 2018/0287659 A1 | 10/2018 | Ramesh et al. | | |
| 2018/0294941 A1 | 10/2018 | Chapman et al. | | |
| 2018/0343031 A1 | 11/2018 | Yagil et al. | | |

OTHER PUBLICATIONS

Cable Television Laboratories., "Data-Over-Cable Service Interface Specifications DOCSIS® 3.1, Physical Layer Specification", CM-SP-PHYv3.1-I16-190121, pp. 1-296, Jan. 2019.

* cited by examiner

ESTIMATION OF INTERFERENCE SUPPRESSION FILTERS USING SELECTIVE SIGNAL SWITCHING

CROSS-REFERENCE TO RELATED APPLICATIONS

This application claims the benefit of U.S. Provisional Patent Application 62/690,357, filed Jun. 27, 2018, whose disclosure is incorporated herein by reference.

TECHNICAL FIELD

Embodiments described herein relate generally to communication systems, and particularly to methods and systems for estimation of interference suppression filters.

BACKGROUND

In various wired and wireless communication systems the performance of a receiver is degraded by interfering signals originating from a transmitter. Methods for suppressing such interference are known in the art. For example, International PCT Publication Application WO2004/114578 describes an echo cancellation (EC) system for use in an ADSL System (312). The EC system includes an EC unit that generates a digital echo estimate signal at a lower sampling rate of the transmitted signal and then interpolates the digital signal to a higher sampling rate to cancel an echo signal thereby reducing complexity (304). The digital interpolated echo estimate signal is converted to analog form for use in analog echo cancellation (306). A subtracted signal resulting from the analog echo cancellation is converted into digital domain and used as feedback for the EC unit to adaptively improve the accuracy of the echo estimate (308).

U.S. Patent Application Publication 2018/0287659 describes systems and methods for full duplex DOCSIS cable modem echo cancellation with training. During reception of downstream signals, echo effects on downstream signals may be determined, with at least some of the echo effects corresponding to concurrently transmitted upstream signals. Echo cancellation corrections may be determined based on the determined echo effects, and the echo cancellation corrections may be applied during processing of the downstream signals. The echo cancellation may include or be based on preforming echo cancellation training, during active communication and based on one or both of the downstream signals and the upstream signals.

An international telecommunications standard, referred to as "Data Over Cable Service Interface Specification" (DOCSIS) that was developed by CableLabs and contributing companies, specifies the transfer of high-bandwidth data over existing cable TV (CATV) systems. In 2017, a Full Duplex (FDX) version of DOCSIS version 3.1 has been announced, in which at least part of the spectrum of the cable plant can be used simultaneously in both upstream and downstream directions. The physical layer of the DOCSIS 3.1 standard, including FDX, is specified, for example, in Annex F of the specifications "Data-Over-Cable Service Interface Specifications DOCSIS® 3.1, Physical Layer Specification," CM-SP-PHYv3.1-I16-190121, January 2019.

SUMMARY

An embodiment that is described herein includes a transceiver, including a transmission chain, a reception chain, an interference suppression module and a processor. The transmission chain is configured to transmit a downstream signal to a communication network. The reception chain is configured to receive an upstream signal at least from the communication network, the upstream signal includes one or more of (i) upstream transmissions originating by client devices coupled to the communication network, and (ii) an interference signal created by at least one of: leakage of the downstream signal into the reception chain, and reflections of the downstream signal received in the reception chain. The reception chain includes a configurable switch for connecting or disconnecting the upstream signal. The interference suppression module is configured to apply to the downstream signal a filter response function for generating an interference suppression signal to be subtracted from the upstream signal at a selected suppression point along the reception chain. The processor is configured to estimate the filter response function for suppressing the interference signal, by monitoring the upstream signal while toggling the switch to connect and to disconnect the upstream signal, and to set the switch to connect the upstream signal and configure the interference suppression module to apply the estimated filter response function to the downstream signal.

In some embodiments, the interference suppression module is configured to produce an analog suppression signal, by applying the filter response function to a signal that is a copy of or derived from the downstream signal that is input to the transmission chain, and converting to analog form, the reception chain is configured to produce a combined signal by combining between the upstream signal and the analog suppression signal, and the processor is configured to estimate the filter response function by monitoring the combined signal. In other embodiments, the processor is configured to set the switch to connect the upstream signal and monitor the combined signal for estimating a first channel, to set the switch to disconnect the upstream signal and monitor the combined signal for estimating a second channel, and to calculate the filter response function based on the estimated first channel and on the estimated second channel. In yet other embodiments, in estimating the first channel, the processor is configured to set the filter response function to zero for eliminating the filter response function.

In an embodiment, in estimating the second channel, the processor is configured to set one coefficient of the filter response function to a scalar value and all other coefficients of the filter response function to a zero value. In another embodiment, the processor is configured to estimate an inverse transfer function of the second channel, while setting one coefficient of the filter response function to a scalar value and all other coefficients of the filter response function to a zero value, and to calculate the filter response function by multiplying a transfer function of the first channel by the inverse transfer function of the second channel. In yet another embodiment, the upstream signal includes a combination of N upstream signals, the configurable switch includes N switches for connecting or disconnecting each of the N upstream signals, and the processor is configured to toggle the N switches together so as to connect or disconnect the N upstream signals simultaneously.

In some embodiments, the transmission chain includes a splitter that splits the downstream signal into N downstream signals, each of the downstream signals is degraded by noise and distortion caused by a respective power amplifier of the transmission chain, the upstream signal includes N upstream signals corresponding to the N downstream signals that were degraded by the noise and the distortion, the filter response function includes N respective filter response functions applied respectively to N sampled versions of the N downstream signals, and the interference suppression signal sums N outputs of the filter response functions. In other embodiments, the processor is configured to set a selected switch among the N switches to connect a respective upstream signal, to set all other N−1 switches to disconnect all other upstream signals, and to estimate a selected filter response function among the N filter response functions by monitoring a first signal input to the selected filter response function and a second signal at the selected suppression point of the reception chain. In yet other embodiments, the processor is configured to schedule estimation of the filter response function to a time period during which the upstream signal includes no upstream transmissions from the client devices.

There is additionally provided, in accordance with an embodiment that is described herein, a method for communication, including, in a transceiver that includes a transmission chain and a reception chain, transmitting by the transmission chain a downstream signal to a communication network, and receiving by the reception chain an upstream signal at least from the communication network. The upstream signal includes one or more of (i) upstream transmissions originating by client devices coupled to the communication network, and (ii) an interference signal created by at least one of: leakage of the downstream signal into the reception chain, and reflections of the downstream signal received in the reception chain, The reception chain includes a configurable switch for connecting or disconnecting the upstream signal. A filter response function is applied to the downstream signal for generating an interference suppression signal to be subtracted from the upstream signal at a selected suppression point along the reception chain. The filter response function for suppressing the interference signal is estimated, by monitoring the upstream signal, while toggling the switch to connect and to disconnect the upstream signal. The switch is set to connect the upstream signal and the transceiver is configured to apply the estimated filter response function to the downstream signal.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for estimation of interference suppression filters using selective signal switching. The disclosed embodiments are applicable, for example, in a transceiver operating in a full duplex mode.

A transceiver is a communication apparatus comprising a transmitter and a receiver. Since the signal transmitted by the transmitter is typically much stronger than the signal received at the receiver, a portion of the transmitted signal typically leaks to the receiver, e.g., due to imperfect isolation. The transmitted signal may also interfere with the received signal, by being reflected back to the receiver from an antenna or a wire connector at the transmitter output, or by various elements of the communication network. Other interference sources include thermal noise, quantization noise due to conversion between analog and digital signals, and nonlinear distortion caused mainly by power amplifiers. Although the interfering signal is typically weaker than the originating transmitted signal, its level may be sufficiently high, compared to the received signal, to degrade the receiver performance.

Signal reflections are typically caused due to imperfect impedance matching at the point of reflection. In a wireless network, reflections may also be caused by a multipath channel. In the present context, the term "reflection" refers to an attenuated and delayed replica of the transmitted signal. The term "reflection" is also referred to as "echo."

In some embodiments, a transceiver comprises a transmission (TX) chain that splits an input downstream signal into multiple downstream signals for transmission to a communication network over multiple respective legs. The transceiver comprises a reception (RX) chain that receives multiple upstream signals, via the multiple legs. Each of the upstream signals may be individually connected or disconnected using a respective switch. Upstream signals that are actually connected at a given time are combined to produce a combined upstream signal. Switching the upstream signals has little or no effect on the downstream transmissions.

In the context of the present disclosure and in the claims, the term "upstream signal" refers to a signal that is processed by the RX chain. An upstream signal comprises at least one of (i) upstream transmissions originating by client devices coupled to the communication network, and (ii) an interference signal created by at least one of: leakage of the downstream signal into the reception chain, and reflections of the downstream signal received in the reception chain.

The transceiver may perform interference suppression by applying to the downstream signal a suppression filter that produces a suppression signal to be subtracted from the upstream signal. The response function of the suppression filter emulates an interference channel between a selected TX reference point along the TX chain and a selected RX suppression point along the RX chain.

In principle, estimating the response function of the suppression filter for suppressing noise and distortion interference caused by power amplifiers of the legs, can be carried out while receiving the upstream signals. This, however, typically involves solving a Multiple Input Multiple Output (MISO) problem, which is complex and requires long training periods.

In the disclosed embodiments, upstream signals are selectively connected to or disconnected from the RX chain for reducing the complexity in estimating the response function of a suppression filter.

In some embodiments, the transceiver comprises at least one of a single-ref interference suppressor and a multi-ref interference suppressor. The single-ref interference suppressor comprises a first filter that emulates an interference channel between the input of the TX chain and an analog RX suppression point. The multi-ref interference suppressor comprises multiple second filters corresponding to the respective multiple legs, wherein each of the second filters emulates an interference channel between a sampling port of a coupler monitoring an output signal of a respective power amplifier of the relevant leg, and a digital RX suppression point. The outputs of the second filters are summed to produce a digital suppression signal.

The transceiver comprises a processor, which is configured to estimate the response functions of the first filter and of the second filters. In some embodiments, for estimating the various response functions, the processor monitors an observed signal, e.g., at a RX suppression point of the multi-ref suppressor, while toggling the multiple switches to connect and to disconnect the upstream signals. After estimating the response functions, the processor configures the transceiver to normal operation by setting the switches to connect the upstream signals, and configuring the first filter and second filters to apply the estimated response functions, respectively.

In some embodiments, the processor is configured to estimate the response function of the first filter by: (i) setting all the switches to connect the respective upstream signals, and monitoring the observed signal for estimating a first channel, (ii) setting all the switches to disconnect the respective upstream signals and monitoring the observed signal for estimating a second channel, and (iii) calculating the response function of the first filter based on the estimated first channel and on the estimated second channel. For example, the processor calculates the response function of the first filter by dividing the response function of the first channel by that of the second channel. In some embodiments, in estimating the first channel and the second channel, the processor is configured to set the response function of the first filter to zero and to unity, respectively. In an embodiment, instead of a unity filter response, a response function having one scalar valued coefficient and all other coefficients are zeroed, can also be used.

In some embodiments, instead of estimating the second channel, the processor estimates an inverse response function of the second channel. In this embodiment, the processor calculates the response function of the first filter by multiplying the response function of the first channel by that of the inverse response function.

In the disclosed embodiments, interference suppression techniques are applied to improve the receiver performance when operating in a full duplex mode. By selectively connecting and disconnecting upstream signals, response functions of suppression filters are estimated efficiently, resulting in reduced complexity and training time.

System Description

Figure 1:
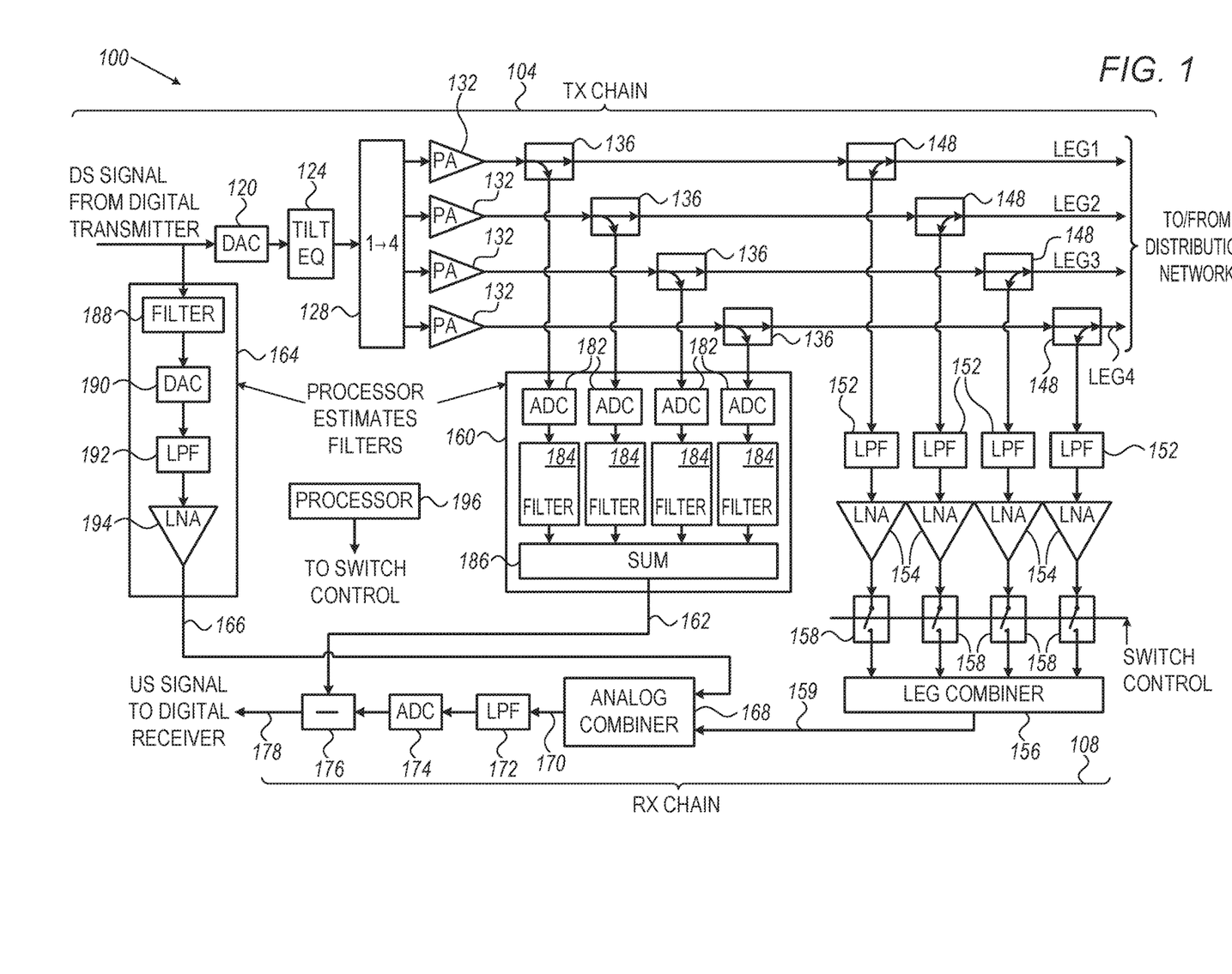
FIG. 1 is a block diagram that schematically illustrates a transceiver that supports interference suppression, in accordance with an embodiment that is described herein.

FIG. 1 is a block diagram that schematically illustrates a transceiver 100 that supports interference suppression, in accordance with an embodiment that is described herein. The transceiver of FIG. 1 operates in a multi-leg node configuration that enables efficient transmission of the same data to multiple subscribers in a communication network with minimal hardware duplication.

Transceiver 100 can be used for transmitting downstream signals to any suitable communication network and for receiving upstream signals from the communication network. For example, the transceiver may reside in a cable TV headend or node that communicates bi-directionally with end users equipped with Cable Modems (CMs) over a wire communication network, e.g., in accordance with the FDX DOCSIS 3.1 standard cited above.

Transceiver 100 comprises a transmission (TX) chain 104 and a reception (RX) chain 108. FIG. 1 depicts only the analog parts of the TX and RX chains. In FIG. 1, the TX chain receives a digital downstream signal (DS) from a digital transmitter (not shown) and transmits multiple copies of the downstream signal to the distribution network. The RX chain receives from the distribution network multiple analog upstream signals, and delivers a digital upstream signal (US) to a digital receiver (not shown).

Tx chain 104 comprises a Digital to Analog Converter (DAC) 120 that converts the digital downstream signal received from the digital transmitter to analog form. The TX chain further comprises an up-tilt equalizer 124 that emphasizes high frequencies of the downstream signal to compensate for the channel response, and a splitter 128 that in the present example splits the downstream signal into four downstream signal-copies that are amplified separately by four respective Power Amplifiers (PAs) 132. In alternative embodiments, splitter 128 may split the downstream signal into any suitable number N>1 of signal-copies other than four.

The transceiver transmits the downstream signals output by PAs 132 to the distribution network via respective TX couplers 136, RX couplers 148 and further via respective output legs denoted LEG1 . . . LEG4. Each of the legs typically comprises a Radio Frequency (RF) connector. The downstream signals output by PAs 132 are additionally sampled using TX couplers 136, and summed for generating a suppression signal, as will be described below.

In the present context, CMs of the distribution network that are connected to LEG1 . . . LEG4, are assumed to belong to a common DOCSIS service group as specified, for example, in the FDX DOCSIS 3.1 standard cited above. The legs serving a given service group transmit the same downstream signal, and receive respective upstream signals assigned to different time/frequency resources, i.e., mini-slots containing multiple subcarriers.

The above assumption typically does not hold for mini-slots assigned to collision-based messages such as request or initial ranging. Collisions may also occur on such mini-slots by CMs coupled to the same leg. Note that even though there are several physical legs, the underlying scheduling scheme assumes that time-frequency resources are shared between all CMs as if these CMs were coupled to the same leg. The common service group assumption is needed for combining the legs in the Rx path without the risk of a collision, i.e., transmission of CMs from different legs on the same mini-slots is not allowed (excluding transmissions that are collision-based by nature as described above).

Rx chain 108 receives four upstream signals from respective legs LEG1 . . . LEG4 via respective RX couplers 148. The upstream signals are filtered using respective Low Pass Filters (LPFs) 152, amplified using respective Low Noise Amplifiers (LNAs) 154, and combined using a four-to-one leg combiner 156.

Each of the upstream signals is connected to or disconnected from leg combiner 156 using a respective switch 158.

In some embodiments, switch 158 comprises a Single Pole, Single Throw (SPST) type of switch, having two terminals that are either connected together or disconnected from one another. The switch state in which the terminals are interconnected is also referred to as an "ON position." The switch state in which the terminals are disconnected from one another is also referred to herein as an "OFF position." In transceiver 100, each of switches 158 is configurable individually to the ON position or to the OFF position. This means that a given switch can be set to the ON or OFF position independently of the ON/OFF configuration of the other switches.

In an alternative embodiment, the sampled outputs of RX couplers 148 are first switched using switches 158, combined using leg combiner 156, and then filtered and amplified using LPF 152 and LNA 154 or other suitable filter and amplifier. More generally, in some embodiments, the RF path between RX coupler 148 and leg combiner 156 may comprise multiple RF elements such as LPF 152, LNA 154 and switch 158, and possibly other elements such as an attenuator (not shown), wherein the RF elements are coupled to one another in any suitable order along that RF path. The order of the RF elements in this path may be chosen based on any suitable RF design considerations.

The signal output by leg combiner 156 comprises a combined upstream signal 159 that combines one or more of the received upstream signals that are actually connected using respective switches 158. For example, when only one switch 158 is configured to the ON position and all other switches are configured to the OFF position, the leg combiner passes the respective upstream signal to its output as the combined upstream signal. As another example, when all of the switches are configured to the ON position, the leg combiner combines the four upstream signals to produce combined upstream signal 159.

In the present example, transceiver 100 performs interference suppression in both the analog domain and the digital domain. To this end, the transceiver comprises a multi-ref interference suppressor 160 that produces a digital suppression signal 162, and a single-ref interference suppressor 164 that produces an analog interference suppression signal 166. Methods for estimating suppression filters belonging to multi-ref interference suppressor 160 and to single-ref interference suppressor 164 will be described in detail below.

RX chain 108 comprises an analog combiner 168 that produces an analog suppressed signal 170 by combining between (i) combined upstream signal 159 and (ii) analog interference suppression signal 166. Note that since analog interference suppression signal 166 is derived from a TX reference point preceding DAC 120, analog combiner 168 cannot suppress noise and distortion signals produced, e.g., by PAs 132.

A LPF 172 filters analog suppressed signal 170, and an Analog to Digital Converter (ADC) 174 samples the filtered signal and converts the sampled signal to a digital form. In an embodiment, LPF 172 serves as an antialiasing filter preceding the sampling operation. A digital subtraction module 176 subtracts digital suppression signal 162 from the digital signal output by ADC 174 to produce a digital suppressed signal 178, which is delivered to the digital receiver. Since digital suppression signal 162 is derived from TX reference points sampled after PAs 132, subtraction module 176 suppresses noise and distortion produced by PAs 132, DAC 120 and any component positioned between the DAC and the PA such as up-tilt equalizer 124 and splitter 128.

Multi-ref interference suppressor 160 receives a downstream signal sample from each PA 132 via a respective TX coupler 136, and samples and converts this sampled downstream signal to a digital form using a respective ADC 182. In some embodiments, each ADC 182 is preceded by a respective antialiasing filter (not shown). In the embodiment of FIG. 1, multi-ref interference suppressor 160 comprises four suppression filters 184, one suppression filter per leg or ADC 182.

Each suppression filter 184 is configured to apply a response function that attempts to create a replica of the echo signal of the relevant PA output at subtraction module 176. Methods for estimating the response functions of filters 184 will be described in detail below. Multi-ref interference suppressor 160 further comprises an adder module 186 that sums the four outputs of suppression filters 184 to produce digital suppression signal 162.

In the example of FIG. 1, the TX reference point for single-ref interference suppressor 164 comprises the input to DAC 120 of the TX chain. Alternatively, other suitable TX reference points preceding DAC 120 can also be used. In general, the signal input to interference suppressor 164 should comprise components of the downstream signal that may cause interference to the upstream signal. In some embodiments, single-ref interference suppressor 164 receives a signal that is derived from the downstream signal input to DAC 120. In an example embodiment, the signal derived from the downstream signal may comprise a filtered and decimated version of the downstream signal input to DAC 120, to exclude signal frequencies above the RF band specified for full duplex operation. Such filtering and decimation operations are possible because LPFs 152 filter out the frequencies above the full-duplex band, and result in reduced complexity in implementing suppression filter 188. Single-ref interference suppressor 164 processes the downstream signal (or the signal derived from this downstream signal) to produce analog interference suppression signal 166. In the present example, the processing elements within single-ref interference suppressor 164 comprise a suppression filter 188, a DAC 190, a LPF 192 and an LNA 194. In other embodiments, e.g., depending on RF design considerations, single-ref interference suppressor 164 may comprise a processing chain comprising only filter 188 and DAC 190. Further alternatively or additionally, single-ref interference suppressor 164 may comprise RF elements such as an attenuator.

Suppression filter 188 has a response function that combined with the response functions of DAC 190, LPF 192 and LNA 194 emulates the transfer function between the TX reference point at the input to interference suppressor 164 and an input 159 to analog combiner 168 that additionally receives analog interference suppression signal 166, as noted above. DAC 190 converts the signal output by suppression filter 188 to an analog form, and LPF 192 and LNA 194 respectively filter and amplify this analog signal to produce analog interference suppression signal 166.

Transceiver 100 comprises a processor 196, which among other tasks, is configured to estimate the response functions of suppression filters 184 and of suppression filter 188. In estimating these response functions, the processor toggles switches 158 to selected combinations of ON and OFF positions per switch, as will be described below. In some embodiments, for estimating the response functions of the suppression filters, processor 196 monitors digital signals at selected points within the transceiver, such as, for example, the input to DAC 120, the output of ADC 174 and the outputs of ADCs 182.

The processor may estimate the response functions of suppression filters 184 and 188 in a suitable transform domain such as the domain of the Z-transform. In the present context, a response function in the Z-transform domain represents a mapping between an input signal X(z) and an output signal Y(z), i.e., Y(z)=H(z)·X(z), or H(z)=Y(z)/X(z). Given an estimated response function H(z) of a filter 184 or 188, the processor may implement the filter, based on H(z), in the time domain or in the frequency domain, using any suitable methods. Alternatively, a transfer function can be represented in time domain, e.g., using an impulse response representation, or using any other suitable transform domain.

The configuration of transceiver 100 shown in FIG. 1 is an example configuration, which is chosen purely for the sake of conceptual clarity. In alternative embodiments, any other suitable transceiver configuration can also be used.

Each of processor 196, TX chain 104, RX chain 108, multi-ref suppressor 160 and single-ref suppressor 164 may be integrated in a single device (e.g., on a single silicon die) within transceiver 100. Alternatively, each of processor 196, TX chain 104, RX chain 108, multi-ref suppressor 160 and single-ref suppressor 164 is implemented in a separate device. Further alternatively, any other suitable partition of the elements comprised in transceiver 100 into separate devices can also be used.

The different elements of transceiver 100 may be implemented using suitable hardware, such as in one or more Application-Specific Integrated Circuits (ASICs) or Field-Programmable Gate Arrays (FPGAs).

In some embodiments, some elements of transceiver 100, e.g., multi-ref interference suppressor 160 and single-ref interference suppressor 164 can be implemented using software, or using a combination of hardware and software elements. Elements of transceiver 100 that are not mandatory for understanding of the disclosed techniques have been omitted from the figure for the sake of clarity.

In some embodiments, some of the functions of transceiver 100 may be implemented in a general-purpose processor, e.g., processor 196, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although in the example of FIG. 1, TX directional coupler 136 and RX directional coupler 148 comprise separate elements, in alternative embodiments, a pair of TX directional coupler 136 and RX directional coupler 148 of each leg are implemented as a single bi-directional coupler.

Architectural Considerations for Effective Interference Suppression

RX chain 108 of FIG. 1 may experience various types of interference such as leakage and echoes of the transmitted signals. Other interference sources include thermal noise, quantization noise generated by ADC 174 and ADCs 182, and by DACs 120 and DAC 190, and nonlinear distortion caused mainly by PAs 132.

Due to limited isolation, the outputs of PAs 132 may leak through RX couplers 148 into the RX chain and degrade the receiver performance. In addition, due to impedance mismatch, the downstream signal transmitted via each of the node legs may be reflected as an echo from the respective RF connector and/or by taps and other elements in the distribution network to which the leg connects. In general, the RX chain experiences an interference that is the sum of the individual interferences associated with the different legs.

Since PAs 132 transmit at a power level that is typically significantly higher than the typical receive level, the level of the interference is much higher than the received upstream signal, and therefore the dynamic range of the RX chain, e.g., of LNAs 154 and ADC 174, should be designed sufficiently high to accommodate that signal to interference power difference.

In the architecture of FIG. 1, multi-ref interference suppressor 160 accepts multiple downstream signals from TX reference points at the outputs of respective PAs 132. This configuration allows suppressing interference caused by thermal noise, quantization noise of DAC 120, and nonlinear distortion caused by PAs 132. Note that such noise and nonlinear distortion effects are invisible to single-ref interference suppressor 164 because its TX reference point is drawn prior to DAC 120.

Although the noise and distortion reflections are much weaker than the reflections of the TX signal, and are also typically weaker than the upstream signals received at the RX chain via the node legs, noise and nonlinear distortion may still limit the Signal to Noise Ratio (SNR) that can be achieved at the RX chain. Suppressing noise and distortion is therefore required for achieving high spectral efficiency.

In the example of FIG. 1, multi-ref interference suppressor 160 samples the outputs of PAs 132 and provides a digital suppression signal 162 to be subtracted from the output of ADC 174. Multi-ref interference suppressor 160 therefore suppresses undesired components such as quantization noise of DAC 120 and distortion generated within PA 132.

The behavior of a system such as a filter or a channel may be specified, for example, in a suitable transform domain, using a response function of the system, also referred to a transfer function.

For a given leg (among LEG1 . . . LEG4) the same transfer function models the interference channel for the downstream signal output by the respective PA and the interference channel for the noise and distortion associated with that PA. Note that although the same downstream signal is transmitted via all the legs LEG1 . . . LEG4, each leg experiences different noise and distortion interference corresponding to a different interference channel. Thus, the noise and distortion interference channels for the different legs are typically modeled by different respective transfer functions and therefore they cannot be modeled by a combined channel (as can be done for the downstream signal interference channel).

The above discussion implies that for suppressing the noise and distortion interference of the PAs, a dedicated suppression signal should be generated for each leg. In the embodiment of FIG. 1, this is implemented by using a separate suppression filter 184 for each leg, as described above.

Estimation of Response Functions of Suppression Filters in Multi-Ref Suppressor

Embodiments that will be described in this section address the estimation of the response functions of suppression filters 184 for generating digital suppression signal 162.

Figure 2:
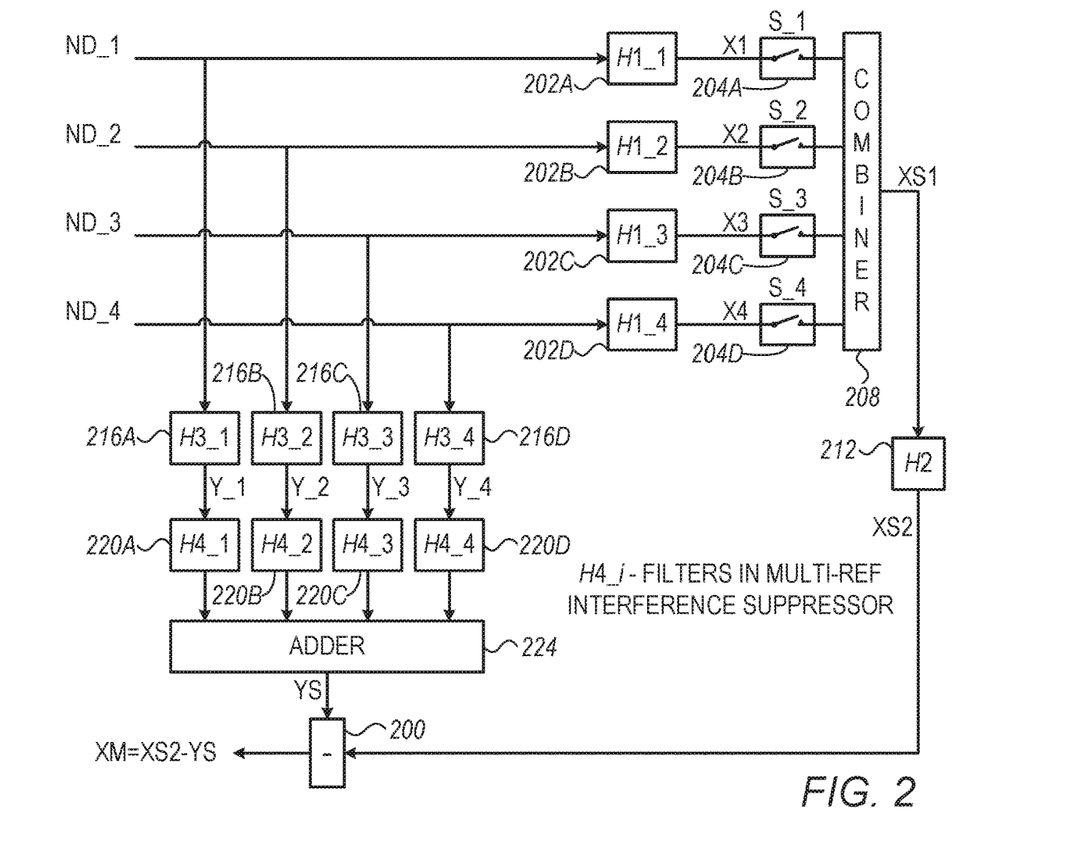
FIG. 2 is a block diagram that schematically illustrates a model for estimating the response functions of suppression filters in a multi-ref interference suppressor of the transceiver of FIG. 1, in accordance with an embodiment that is described herein.

FIG. 2 is a block diagram that schematically illustrates a model for estimating the response functions of suppression filters 184 in multi-ref interference suppressor 160 of transceiver 100 of FIG. 1, in accordance with an embodiment that is described herein.

In FIG. 2, input signals denoted ND_1 ... ND_4 correspond to the noise and distortion components of the respective four downstream signals output by PAs 132 toward the respective legs LEG1 ... LEG4. The RX suppression point in this model is subtraction module 200 that models subtraction module 176 of FIG. 1.

The model in FIG. 2 comprises transfer functions that model the various channels applied to the input signals ND_1 ... ND_4. The signals ND_1 ... ND_4 traverse via a first route that includes the distribution network, and via a second route that includes the multi-ref interference suppressor 160.

In the model of FIG. 2, the first route comprises transfer functions 202A ... 202D denoted H1_1 ... H1_4 corresponding to respective legs LEG1 ... LEG4, switches 204A ... 204D denoted S1 ... S4, combiner 208 and a transfer function 212 denoted H2. Transfer functions H1_i (i=1 ... 4) model the channels between the outputs of the relevant PAs and the input to leg combiner 156.

In the present example, each of transfer functions H1_i models a direct pass via TX coupler 136, a direct pass via RX coupler 148, relevant parts of the distribution network that cause signal reflections, a sampling pass via RX coupler 148, LPF 152, LNA 154, a transfer function of switch 158 and a transfer function of leg combiner 156. Switch 204 models an ideal on-off functionality of switch 158, and combiner 208 models the summing operation of leg combiner 156. Transfer function H2 models a channel between the output of leg combiner 156 and the output of ADC 174, which includes analog combiner 168, LPF 172 and ADC 174.

The second route, which includes the multi-ref interference suppressor, comprises transfer functions 216A ... 216D denoted H3_1 ... H3_4, transfer functions 220A ... 220D denoted H4_1 ... H4_4, and an adder module 224. Each transfer function H3_i (i=1 ... 4) models a sampling pass via a TX coupler 136 followed by an ADC 182. Each transfer function H4_i models a respective suppression filter 184. Adder module 224 models adder module 186 of multi-ref interference suppressor 160.

Let XS2 denote the signal output by transfer function H2, and let YS denote the signal output by adder module 224. For achieving effective interference suppression, transfer functions H4_1 ... H4_4 should be configured such that the signal YS well approximates the signal XS2, i.e., the suppressed signal denoted XM, given by XM=XS2−YS is (at least approximately) zeroed. Such suppression can be achieved, for example, by suppressing interference for the individual legs LEG1 ... LEG4, as given by:

$$H4\_i = \frac{H1\_i \cdot H2}{H3\_i}, i = 1 \ldots 4 \quad \text{Equation 1}$$

Equation 1 implies that for optimal interference suppression, the following expression should be satisfied or at least closely approximated:

$$H4\_i \cdot H3\_i = H1\_i \cdot H2, i=1 \ldots 4 \quad \text{Equation 2}$$

Figure 3:
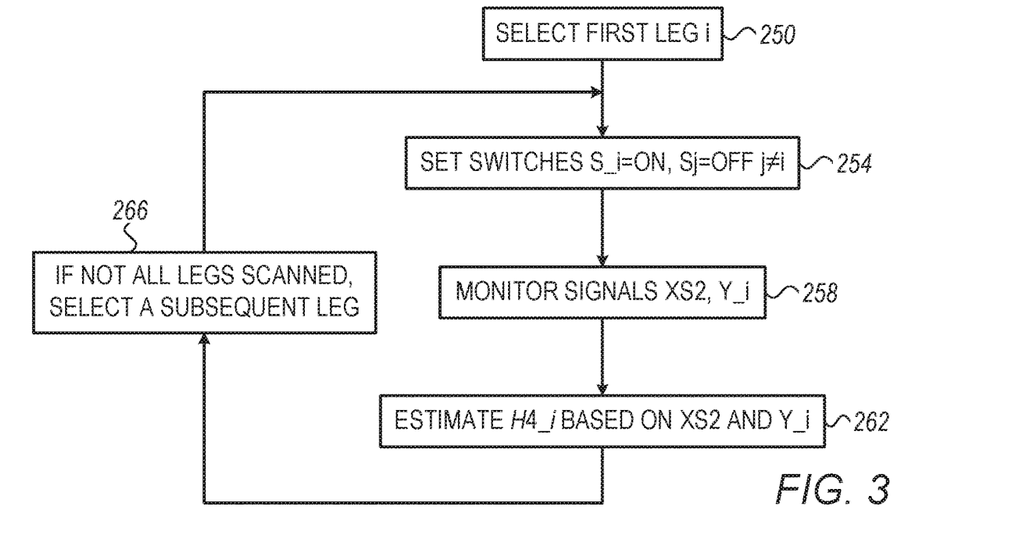
FIG. 3 is a flow chart that schematically illustrates a method for estimating response functions of suppression filters using the model of FIG. 2, in accordance with an embodiment that is described herein.

FIG. 3 is a flow chart that schematically illustrates a method for estimating the response functions of suppression filters 184, using the model of FIG. 2, in accordance with an embodiment that is described herein. The method will be described as being executed by processor 196 of transceiver 100.

The method begins with processor 196 selecting a first leg having an index "i" in the range 1 ... 4, at an initialization step 250. At a switch setting step 254, the processor sets a switch 158 (204) denoted S_i that is associated with the selected leg to the ON position, and sets other switches) S_j wherein j is in the range 1 ... 4 and j≠i, to the OFF position. In this setting of the switches, only the i$^{th}$ leg is connected to the leg combiner. Correspondingly, in the model of FIG. 2, only the output of transfer function H1_i connects to combiner 208 and thus input to transfer function H2.

At a monitoring step 258, processor 196 monitors the signal at the output of ADC 174, i.e., the signal XS2 given by: ND_i·(H1_i·H2). Further at step 258, the processor monitors the signal at the output of ADC 182, i.e., the signal denoted Y_i at the output of H3_i, or equivalently at the input to suppression filter 184, H4_i to be estimated. The signal Y_i is given by ND_i·H3_i.

At an estimation step 262, the processor estimates transfer function H4_i based on the signals XS2 and Y_i monitored at step 258. The transfer function between the signals Y_i and XS2 is given by XS/Y_i=(ND_i·H1_i·H2)/(ND_i·H3_i)=(H1_i·H2)/H3_i), as specified in Equation 1 above. In some embodiments, the estimation problem above may be formulated as follows: estimate a transfer function H4_i such that given an input signal Y_i produces an output signal XS2. The processor may estimate H4_i using any suitable method, such as, for example, using estimation methods commonly used in communication for channel estimation, e.g., the Linear Minimum Mean Square Error (LMMSE) estimation method.

At a loop management step 266, the processor checks whether all legs LEG1 ... LEG4 have been processed, and if not, the processor selects a subsequent leg among LEG1 ... LEG4, which has not been processed yet, and loops back to step 254 to re-configure the four switches accordingly.

After looping over all legs, the response functions of all suppression filters 184 are estimated, and the method terminates. At this point, processor 196 configures suppression filters 184 based on the estimated transfer functions H4_1 ... H4_4, sets all switches 158 to the ON position for normal transmit and receive operation while applying suppression filters 184.

In some embodiments, processor 196 repeats the method of FIG. 3 periodically, or based on any suitable criterion. In an example embodiment, the processor may perform the method of FIG. 3 in response to detecting that one or more of channels H1_i, H2 and H3_i have changed, e.g., due to a temperature change, mechanical movements and the like.

Estimation of Response Function of Suppression Filter in Single-Ref Suppressor

Embodiments that will be described in this section address the estimation of the response function of suppression filter 188 for generating analog interference suppression signal 166.

Figure 4:
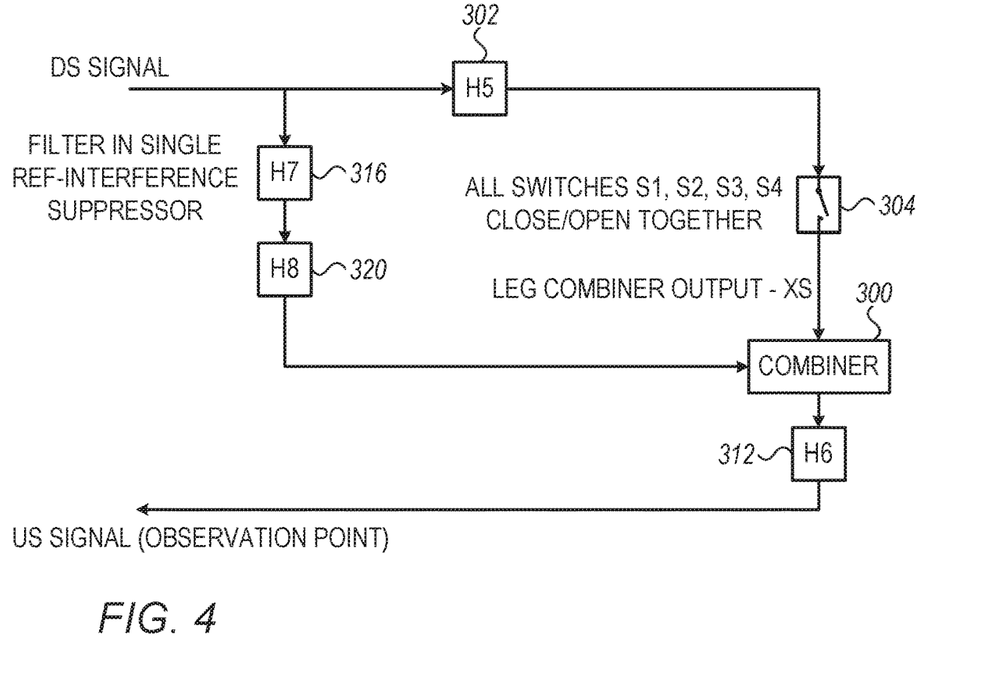
FIG. 4 is a block diagram that schematically illustrates a model for estimating a response function of a suppression filter in a single-ref interference of the transceiver of FIG. 1, in accordance with an embodiment that is described herein.

FIG. 4 is a block diagram that schematically illustrates a model for estimating a response function of suppression filter 188 in single-ref interference 164 of transceiver 100 of FIG. 1, in accordance with an embodiment that is described herein.

In the model of FIG. 4, the input to DAC 120 serves as a TX reference point, and combiner 300 that models analog combiner 168 of FIG. 1 serves as a RX suppression point.

Note that in this case, the observation point at the output of ADC 174 is different from the RX suppression point. In some embodiments, the TX reference point at the input of single-ref interference suppressor 164 comprises a processed version (e.g., lowpass filtered and possibly decimated version) of the downstream signal input to DAC 120, as described above.

The model in FIG. 4 comprises transfer functions that model the channels applied to the DS signal (i) between the TX reference point and the RX suppression point, (ii) between the RX suppression point and the observation point and (iii) between the output of the suppression filter and the RX suppression point. The DS signal traverses a first route that includes the distribution network and a second route that includes the single-ref interference suppressor 164.

In the model of FIG. 4, the first route comprises a transfer function 302 denoted H5, switches 304 denoted S1 . . . S4 that are all set to the ON position or to the OFF position together, combiner 300, and a transfer function 312 denoted H6.

Transfer function H5 models a channel between the TX reference point and an input to analog combiner 168. The channel modeled by H5 combines the separate channels corresponding to LEG1 . . . LEG4. In the present example, transfer function H5 comprise DAC 120, up-tilt equalizer 124, splitter 128, PAs 132, direct pass via TX couplers 136, direct pass via RX couplers 148, relevant parts of the distribution network that cause signal reflections, sampling pass via RX couplers 148, LPFs 152, LNAs 154, transfer functions of switches 158 and a transfer function of leg combiner 156. Switch 304 models an ideal on-off functionality of switches 158 set to ON or OFF position together. Transfer function H5 additionally includes part of analog combiner 168 related to transferring analog interference suppression signal 166 to the output of analog combiner 168. Transfer function H6 models a channel between the output of analog combiner 168 and the output of ADC 174. In the present example this channel includes LPF 172 and ADC 174. In alternative embodiments, the channel modeled by H6 comprises additional elements following ADC 174 such as filters, signal decimation, frequency shifters, channelizers and the like.

The second route, which includes the single-ref interference suppressor, comprises a transfer function 316 denoted H7, a transfer function 320 denoted H8, combiner 300 and transfer function H6. Transfer function H7 models suppression filter 188 that needs to be estimated. Transfer function H8 models a channel comprising DAC 190, LPF 192 and LNA 194 of the single-ref suppressor. As noted above, single-ref suppressor 164 may comprise additional components (e.g., attenuators), which are also comprised within H8. Transfer function H8 additionally includes part of analog combiner 168 related to transferring combined upstream signal 159 to the output of analog combiner 168.

Based on the model of FIG. 4, optimal interference suppression is achieved when the inputs to combiner 300 match one another, i.e., when the following equation is satisfied:

$$H7 \cdot H8 = H5 \qquad \text{Equation 3:}$$

In the description that follows we assume that a negation operation that is required for subtracting the signal output by H8 from the signal routed via switch 304 and output by H5 is implemented within transfer function H8.

Figure 5:
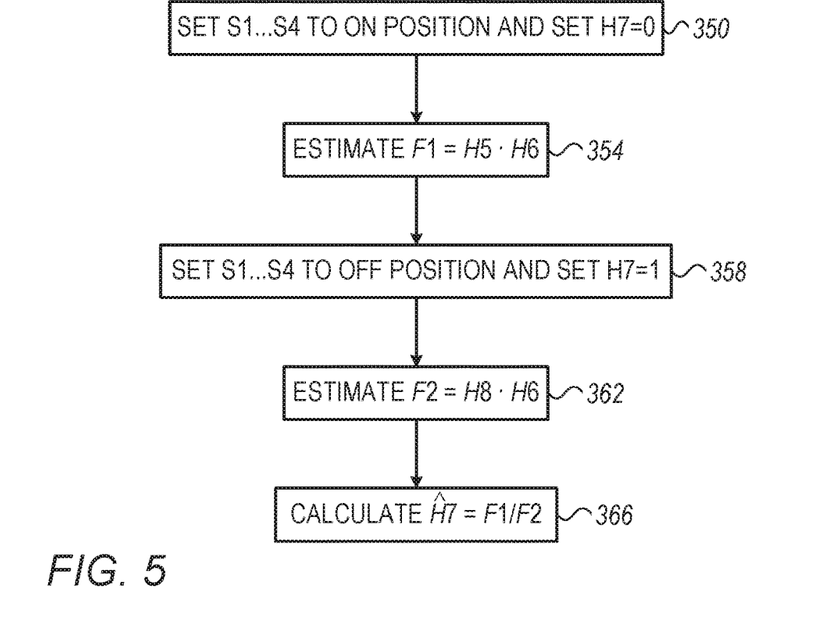
FIG. 5 is a flow chart that schematically illustrates a method for estimating a response function of a suppression filter using the model of FIG. 4, in accordance with an embodiment that is described herein.

FIG. 5 is a flow chart that schematically illustrates a method for estimating a response function of a suppression filter using the model of FIG. 4, in accordance with an embodiment that is described herein. The method will be described as being executed by processor 196 of transceiver 100.

The method begins with processor 196 setting all switches 158 to the ON position, at a first setting step 350. Further at step 350, the processor sets transfer function H7 to a zero transfer function, which forces the output of H8 to a zero signal. Using the settings of step 350, combiner 300 delivers the DS signal processed by transfer function H5 to the input of transfer function H6. At a first estimation step 354, the processor estimates a transfer function denoted F1 between the TX reference point and the observation point as given by:

$$F1 = H5 \cdot H6 \qquad \text{Equation 4:}$$

At a second setting step 358, the processor sets all switches 158 to the OFF position, and sets transfer function H7 to a unity transfer function. In a unity transfer function one coefficient equals '1' and each of the other coefficients equals '0'. Alternatively, a transfer function in which one coefficient equals a scalar value and the other coefficients are zeroed, can also be used. Using the setting of step 358, combiner 300 delivers the DS signal processed by transfer function H8 to the input of transfer function H6. At a second estimation step 362, the processor estimates a transfer function denoted F2 between the TX reference point and the observation point as given by:

$$F2 = H8 \cdot H6 \qquad \text{Equation 5:}$$

At a suppression filter calculation step 366, the processor calculates $\hat{H}7$ by dividing transfer function F1 of Equation 4 by transfer function F2 of Equation 5, which results in canceling H6:

$$\hat{H}7 = \frac{F1}{F2} = \frac{H5}{H8} \qquad \text{Equation 6}$$

The estimated transfer function $\hat{H}7$ satisfies the expression in Equation 3 above. Following step 366 the method terminates. At this point, processor 196 configures suppression filter 188 based on the estimated transfer function $\hat{H}7$, sets all switches 158 to the ON $\hat{H}7$ 30 position for normal transmit and receive operation while applying suppression filter 188.

In some embodiments, at step 358, the processor estimates a transfer function F3 that is an inverse transfer function of transfer function F2, as given by:

$$F3 = \frac{1}{F2} = \frac{1}{H8 \cdot H6} \qquad \text{Equation 7}$$

In these embodiments, the processor calculates transfer function $\hat{H}7$ by calculating:

$$\hat{H}7 = F1 \cdot F3 = \frac{H5}{H8} \qquad \text{Equation 8}$$

In estimating transfer function F3 of Equation 7, the processor estimates an inverse transfer function to the transfer function of the channel between the input of DAC 190 (input to H7) and the output of ADC 174 (output of H6), using the same input and output points used in estimating the transfer function F2. In estimating F2, the processor estimates a transfer function from the input point to the output point. In estimating F3, however, the processor estimates a transfer function from the output point to the input point.

In some embodiments, the estimation problem in estimating F1 (or F2) above may be formulated as follows: estimate a transfer function F1 (or F2) such that given an input signal monitored at the TX reference point produces an output signal monitored at the observation point. In some embodiments, the processor solves such an estimation problem using estimation methods commonly used in communication for channel estimation such as, for example, the LMMSE estimation method. Similar estimation techniques apply in estimating the inverse transfer function F3.

The embodiments described above are given by way of example, and other suitable embodiments can also be used. For example, although the transceiver in FIG. 1 comprises both a multi-ref suppressor and a single-ref suppressor, this configuration is not mandatory. In alternative embodiments, a transceiver may include only a multi-ref suppressor or a single-ref suppressor, and estimate the relevant suppression filter(s), e.g., using the methods described above.

Some of the embodiments disclosed above are applicable to a transceiver comprising a single leg in which the upstream can be connected to or disconnected from the RX chain using a switch. In such embodiments, the processor may estimate the response function of filter 188 of the single-ref suppressor using the method of FIG. 5, based on the model of FIG. 4 in switch 304 models a single switch.

In some embodiments, the processor is configured to schedule estimation of the filter response functions of filters 160 and/or filter 188 to a time period during which the upstream signal comprises no upstream transmissions from the client devices. In alternative embodiments, the processor performs suppression filter estimation while upstream transmissions are present in the upstream signal. In these embodiments, convergence to desired suppression filters may take longer periods of time.

In the embodiments described above, we refer mainly to certain configurations of TX reference and RX reference points to be used by the single-ref and multi-ref suppressors, e.g., as described in FIG. 1. Moreover, the embodiments above refer mainly to suppression filters implemented in the time domain. In alternative embodiments, other TX reference and RX reference points as well as frequency domain filtering can also be used, as described, for example, in U.S. Pat. No. 10,305,706, whose disclosure is incorporated herein by reference.

In some embodiments, a single-ref suppressor such as single-ref suppressor 164, is applied separately to each of the PA monitoring ADCs (182) for suppressing the interfering downstream signal(s) before ADC 174. In these embodiments, the dynamic range of the ADCs used for the multi-ref suppressor is improved.

Although the embodiments that were described above refer mainly to communication in accordance with the FDX DOCSIS 3.1 standard, in which signals are communicated using Orthogonal Frequency-Division Multiplexing (OFDM) modulation, this is not mandatory. In alternative embodiments, the disclosed techniques are applicable to any other suitable modulation method.

Although the embodiments described herein mainly address echo and interference suppression in coaxial cable networks, the methods and systems described herein can also be used in other applications, such as in wireless (e.g., mobile) networks, various Digital Subscriber Line (DSL) based networks (xDSL) and satellite networks.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A transceiver, comprising:
   a transmission chain, configured to transmit a downstream signal to a communication network;
   a reception chain, configured to receive an upstream signal at least from the communication network, wherein the upstream signal comprises one or more of (i) upstream transmissions originating by client devices coupled to the communication network, and (ii) an interference signal created by at least one of: leakage of the downstream signal into the reception chain, and reflections of the downstream signal received in the reception chain, wherein the reception chain comprises a configurable switch for connecting or disconnecting the upstream signal;
   an interference suppression module, configured to apply to the downstream signal a filter response function for generating an interference suppression signal to be subtracted from the upstream signal at a selected suppression point along the reception chain; and
   a processor, configured to:
      estimate the filter response function for suppressing the interference signal, by monitoring the upstream signal, while toggling the switch to connect and to disconnect the upstream signal; and
      set the switch to connect the upstream signal and configure the interference suppression module to apply the estimated filter response function to the downstream signal.

2. The transceiver according to claim 1, wherein the interference suppression module is configured to produce an analog suppression signal by applying the filter response function to a signal that is a copy of or derived from the downstream signal that is input to the transmission chain and converting to analog form, wherein the reception chain is configured to produce a combined signal by combining between the upstream signal and the analog suppression signal, and wherein the processor is configured to estimate the filter response function by monitoring the combined signal.

3. The transceiver according to claim 2, wherein the processor is configured to:
   set the switch to connect the upstream signal and monitor the combined signal for estimating a first channel;
   set the switch to disconnect the upstream signal and monitor the combined signal for estimating a second channel; and
   calculate the filter response function based on the estimated first channel and on the estimated second channel.

4. The transceiver according to claim 3, wherein in estimating the first channel, the processor is configured to set the filter response function to zero for eliminating the filter response function.

5. The transceiver according to claim 3, wherein in estimating the second channel, the processor is configured to set one coefficient of the filter response function to a scalar value and all other coefficients of the filter response function to a zero value.

6. The transceiver according to claim 3, wherein the processor is configured to estimate an inverse transfer function of the second channel, while setting one coefficient of the filter response function to a scalar value and all other coefficients of the filter response function to a zero value, and to calculate the filter response function by multiplying a transfer function of the first channel by the inverse transfer function of the second channel.

7. The transceiver according to claim 1, wherein the upstream signal comprises a combination of N upstream signals, wherein the configurable switch comprises N switches for connecting or disconnecting each of the N upstream signals, and wherein the processor is configured to toggle the N switches together so as to connect or disconnect the N upstream signals simultaneously.

8. The transceiver according to claim 1, wherein the transmission chain comprises a splitter that splits the downstream signal into N downstream signals, wherein each of the downstream signals is degraded by noise and distortion caused by a respective power amplifier of the transmission chain, wherein the upstream signal comprises N upstream signals corresponding to the N downstream signals that were degraded by the noise and the distortion, and wherein the filter response function comprises N respective filter response functions applied respectively to N sampled versions of the N downstream signals, and wherein the interference suppression signal sums N outputs of the filter response functions.

9. The transceiver according to claim 8, wherein the processor is configured to set a selected switch among the N switches to connect a respective upstream signal, to set all other N−1 switches to disconnect all other upstream signals, and to estimate a selected filter response function among the N filter response functions by monitoring a first signal input to the selected filter response function and a second signal at the selected suppression point of the reception chain.

10. The transceiver according to claim 1, wherein the processor is configured to schedule estimation of the filter response function to a time period during which the upstream signal comprises no upstream transmissions from the client devices.

11. A method for communication, comprising:
in a transceiver comprising a transmission chain and a reception chain, transmitting by the transmission chain a downstream signal to a communication network, and receiving by the reception chain an upstream signal at least from the communication network, wherein the upstream signal comprises one or more of (i) upstream transmissions originating by client devices coupled to the communication network, and (ii) an interference signal created by at least one of: leakage of the downstream signal into the reception chain, and reflections of the downstream signal received in the reception chain, and wherein the reception chain comprises a configurable switch for connecting or disconnecting the upstream signal;
applying to the downstream signal a filter response function for generating an interference suppression signal to be subtracted from the upstream signal at a selected suppression point along the reception chain;
estimating the filter response function for suppressing the interference signal, by monitoring the upstream signal, while toggling the switch to connect and to disconnect the upstream signal; and
setting the switch to connect the upstream signal and configure the transceiver to apply the estimated filter response function to the downstream signal.

12. The method according to claim 11, wherein applying the filter response function comprises producing an analog suppression signal by applying the filter response function to a signal that is a copy of or derived from the downstream signal that is input to the transmission chain and converting to analog form, and producing a combined signal by combining between the upstream signal and the analog suppression signal, and wherein estimating the filter response function comprises estimating the filter response function by monitoring the combined signal.

13. The method according to claim 12, wherein estimating the filter response function comprises:
setting the switch to connect the upstream signal and monitoring the combined signal for estimating a first channel;
setting the switch to disconnect the upstream signal and monitoring the combined signal for estimating a second channel; and
calculating the filter response function based on the estimated first channel and on the estimated second channel.

14. The method according to claim 13, wherein estimating the first channel, comprises estimating the first channel while setting the filter response function to zero for eliminating the filter response function.

15. The method according to claim 13, wherein estimating the second channel, comprises estimating the second channel while setting one coefficient of the filter response function to a scalar value and all other coefficients of the filter response function to a zero value.

16. The method according to claim 13, wherein estimating the filter response function comprises estimating an inverse transfer function of the second channel, while setting one coefficient of the filter response function to a scalar value and all other coefficients of the filter response function to a zero value and calculating the filter response function by multiplying a transfer function of the first channel by the inverse transfer function of the second channel.

17. The method according to claim 11, wherein the upstream signal comprises a combination of N upstream signals, wherein the configurable switch comprises N switches for connecting or disconnecting each of the N upstream signals, and wherein toggling the switch comprises toggling the N switches together so as to connect or disconnect the N upstream signals simultaneously.

18. The method according to claim 11, wherein the transmission chain comprises a splitter that splits the downstream signal into N downstream signals, wherein each of the downstream signals is degraded by noise and distortion caused by a respective power amplifier of the transmission chain, wherein the upstream signal comprises N upstream signals corresponding to the N downstream signals that were degraded by the noise and the distortion, wherein the filter response function comprises N respective filter response functions applied respectively to N sampled versions of the downstream signals, and wherein the interference suppression module sums N outputs of the filter response functions.

19. The method according to claim 18, and comprising setting a selected switch among the N switches to connect a respective upstream signal, setting all other N−1 switches to disconnect all other upstream signals, and estimating a selected filter response function among the N filter response functions by monitoring a first signal input to the selected filter response function and a second signal at the selected suppression point of the reception chain.

20. The method to claim 11, and comprising scheduling estimation of the filter response function to a time period during which the upstream signal comprises no upstream transmissions from the client devices.

* * * * *